(No Model.)
W. F. BEARDSLEE.
TRIMMING MECHANISM FOR SEWING MACHINES
No. 438,796. Patented Oct. 21, 1890.
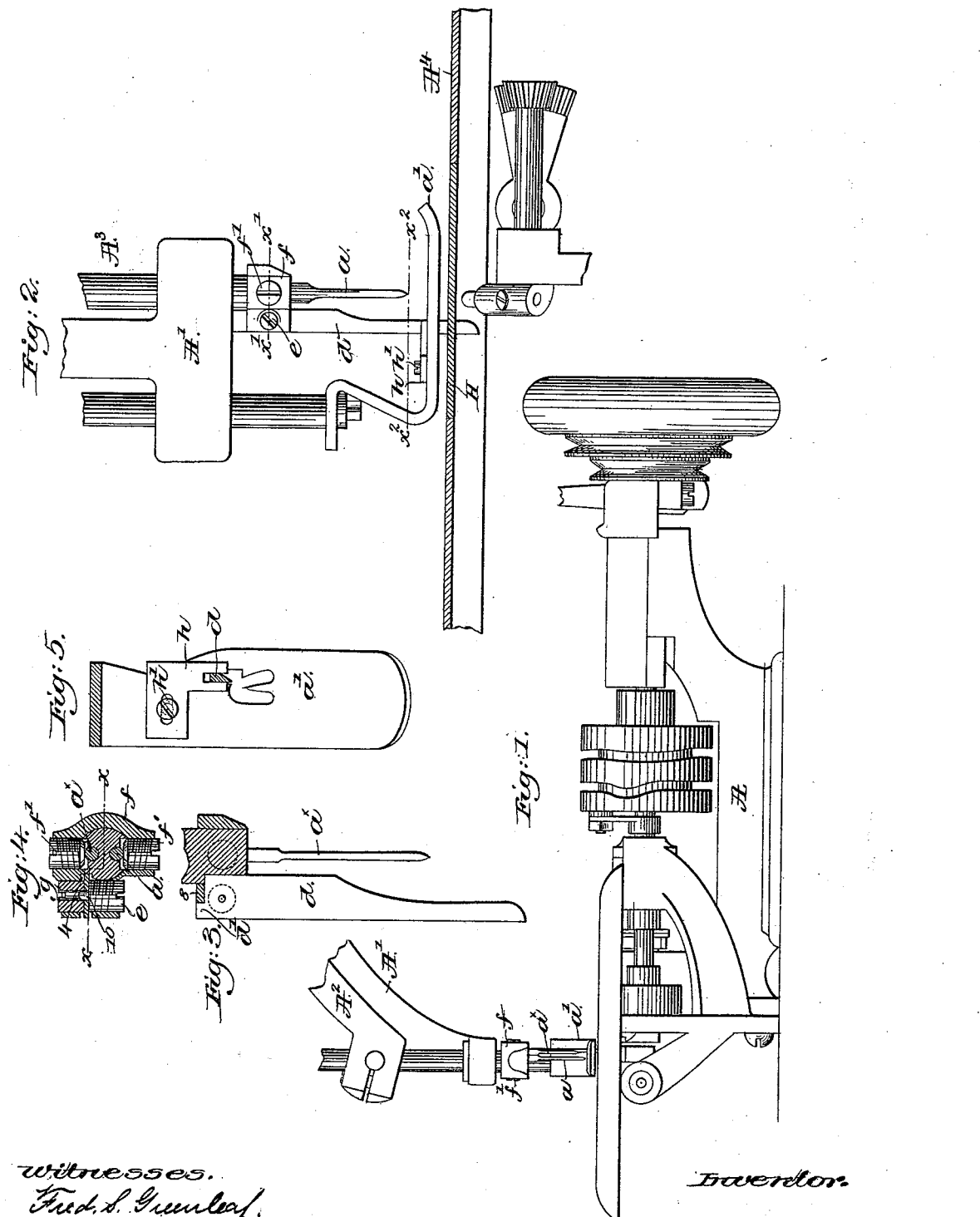

UNITED STATES PATENT OFFICE.

WILLIAM FURMAN BEARDSLEE, OF NEW YORK, N. Y., ASSIGNOR TO THE MANUFACTURER'S SPECIAL MACHINE COMPANY, OF DANBURY, CONNECTICUT.

TRIMMING MECHANISM FOR SEWING-MACHINES.

SPECIFICATION forming part of Letters Patent No. 438,796, dated October 21, 1890.

Application filed June 14, 1890. Serial No. 355,404. (No model.)

*To all whom it may concern:*

Be it known that I, WILLIAM FURMAN BEARDSLEE, of New York, county and State of New York, have invented an Improvement in Trimming-Cutters for Sewing-Machines, of which the following description, in connection with the accompanying drawings, is a specification, like letters on the drawings representing like parts.

This invention has for its object to provide a novel form of trimming mechanism by which to trim material close to lines of stitching and upon a sewing-machine, my improvements relating more especially to means for controlling and adjusting the cutting-blade.

Figure 1 is a partial side elevation of a sufficient portion of a sewing-machine to enable my invention to be understood, the framework and needle-bar-actuating lever being partially broken away; Fig. 2, a left-hand end view of Fig. 1; Fig. 3, an enlarged sectional detail showing the lower end of the needle-bar, a needle and attached cutter, the section being on the line $x$, Fig. 4. Fig. 4 is a horizontal section in the line $x'$, Fig. 2, showing part of the needle-bar. Fig. 5 is a horizontal section of the presser-foot below the line $x^2$.

The frame-work A, of which the overhanging arm A' forms a part, the needle-bar-actuating lever $A^2$, but partially shown, the needles $a\ a^\times$, connected to the lower end of the needle-bar, and the presser-foot $a'$, together with the stitch-forming mechanism co-operating with the needle to form a stitch, are and may be all as usual.

The stitch-forming mechanism underneath the cloth-plate $A^4$ not being made the subject of claim in this application, as it is common to application Serial No. 342,978, filed March 7, 1890, will not be herein further described.

The needle-bar $A^3$ is provided at its lower end with a collar $f$, having two set-screws $f'$ to act each upon and hold a needle $a$ or $a^\times$. This clamp at its rear side has a suitable slot, in which is placed the upper end of the blade or cutter $d$, as shown in Figs. 4 and 5, the thickness of the cutter being less than the width of the slot, in order that the said cutter may be adjusted laterally with relation to the needle, as will be described.

The cutter $d$ has at its upper end a projection $d'$, which abuts against a projection 8, forming part of the clamp $f$, and the said cutter has a hole for the reception of a teat 10, herein shown as projecting from the inner end of a clamping-screw $e$, which is employed to hold the cutter in place. The clamp $f$ receives a second screw $g$, which I call a "backing-screw," it being shown as adapted to be screwed in or out and form a backing for the cutter $d$, the position of the backing-screw determining the distance from the line of stitching at which the cutter will trim the material being stitched. By extending the teat 10 through the hole in the cutter the screws may be moved to adjust the cutter without letting the latter drop down out of the clamp. The lower end of the cutter $d$ is shown as reduced in width, and as extended down through a guide $h$, attached in adjustable manner to the presser-foot $a'$ by a set-screw $h'$, the extreme lower end of the said blade being extended through a slot in the usual presser-foot and in the usual throat-plate H, so that in operation the lower end of the said blade never rises up above the top of the throat-plate; but this being a common construction it has not been deemed necessary to specifically show the throat-plate.

Owing to the reduction in width of the blade, the guide $h$ referred to aids in preventing deflection of the cutter during its operation in the material.

I claim—

1. The needle-bar and an attached clamp having a notch or recess for the upper end of a cutter, combined with a cutter and with an adjustable clamping-screw and an adjustable backing-screw, to operate substantially as described.

2. The needle-bar, a cutter, and a needle-holding clamp having a recess for the reception of the upper end of the cutter, combined with a hollow backing-screw and a set-screw having a teat to enter a hole in the said cutter, substantially as described.

3. The needle-bar, a cutter, and a needle-holding clamp having a recess for the reception of the upper end of the cutter, a hollow backing-screw, a set-screw having a teat to enter a hole in said cutter, and the presser-foot, combined with an adjustable guide connected to the presser-foot and through which the cutter reciprocates, substantially as described.

In testimony whereof I have signed my name to this specification in the presence of two subscribing witnesses.

WILLIAM FURMAN BEARDSLEE.

Witnesses:
ALFRED PARTRIDGE, Jr.
ALBERT C. MERRIAM.